Figure 1:
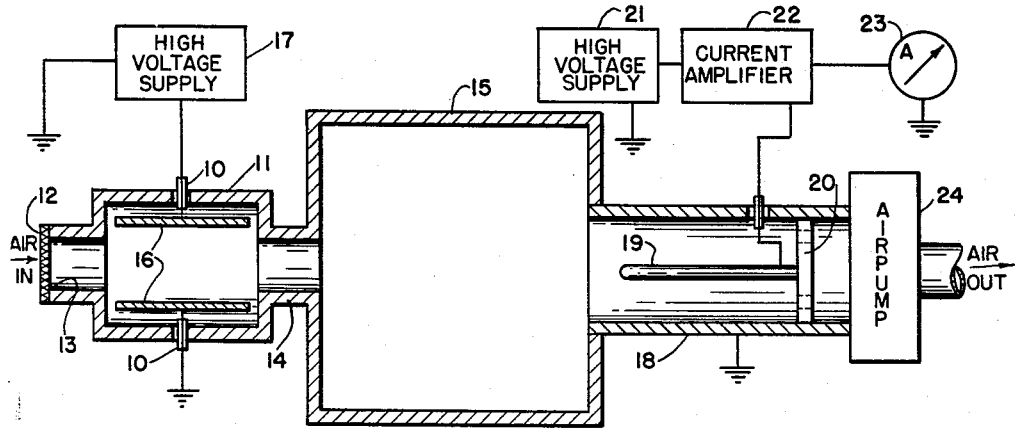

April 2, 1963   J. M. BRINKERHOFF ETAL   3,084,255
RADIATION SENSITIVE SYSTEM
Filed Nov. 13, 1958

INVENTORS
JORIS M. BRINKERHOFF
RICHARD L. BERSIN
BY
ATTORNEY

United States Patent Office 3,084,255
Patented Apr. 2, 1963

3,084,255
RADIATION SENSITIVE SYSTEM
Joris M. Brinkerhoff, Arlington, and Richard L. Bersin, Waltham, Mass., assignors, by mesne assignments, to Laboratory For Electronics, Inc., Boston, Mass., a corporation of Delaware
Filed Nov. 13, 1958, Ser. No. 773,700
10 Claims. (Cl. 250—83.6)

This invention relates in general to nuclear radiation monitoring apparatus and more specifically to a monitor for determining tritium concentration in air.

Radioactive gases, in general, and tritium, in particular, constitute a serious health hazard in areas where relatively high concentrations of these radioactive materials are in use. Maximum permissible concentrations of these materials in air have been established, but a system capable of rendering a continuous indication of the concentrations is desirable in order to maintain effective control.

Tritium presents a particularly serious problem because it can readily be formed into water, which is rapidly assimilated into the human system, yet the relatively low energy of its beta emissions (.018 mev.) makes detection difficult.

In the past, two types of instrument have been used for monitoring tritium, one being the flow ionization chamber, the other a detector of the Geiger-Mueller type. The first type is an open-ended ionization chamber through which the air to be sampled flows at a known rate. This instrument, however, has several undesirable features. First, the device measures ion density in the air which is interpretable only if it is the result of equilibrium between the rate of formation of ions and their rate of recombination. But the time required for such equilibrium to be established is several minutes; and, as a result, the full magnitude of a change in concentration is not indicated until after this period. This lag is a serious fault in personnel monitoring, since significant amounts of tritium might be ingested before any warning of the high concentration is given.

Second, even if equilibrium were obtained, the response would not be directly proportional to the tritium concentration but only approximately proportional to the square root of the tritium concentration, the constant of proportionality being dependent on the recombination coefficient, which is in turn dependent on humidity, temperature, and other ambient conditions. Third is the fact that the instrument will respond to any source of ionization such as match flames, electric motors, and the like. Finally, the response of the instrument, even under ion equilibrium conditions, depends on the flow rate, which must therefore be carefully maintained at a predetermined value.

A second type of monitor which has been used mixes the sampled air with a counting gas such as methane in a predetermined ratio. This mixture is passed through a particle counter of the Geiger-Mueller type where the number of ionizing events occurring in the sensitive volume of the counter is determined. The device requires exceptionally careful control of the proportion of counting gas to air, if not a purification system for the air prior to its admission to the system. Hence, this type of prior apparatus is elaborate, cumbersome, expensive, and of questionable reliability. It is also restricted to relatively small flow rates.

The present invention contemplates and has as a primary object the provision of a sensitive, reliable, non-ambiguous radioactive gas monitor, wherein the gas intake is initially swept clean of ions and particulate matter and wherein the indicated current is directly proportional to the concentration of radioactivity in the gas, while being substantially independent of gas velocity above some predetermined minimum.

It is another object of this invention to provide a sensitive, reliable monitor for the measurement of tritium concentration in a gaseous medium such as air.

It is still another object of this invention to provide a sensitive device for the measurement of the radioactivity content of large physical objects such as clothing, ore samples, etc.

Figure 2:
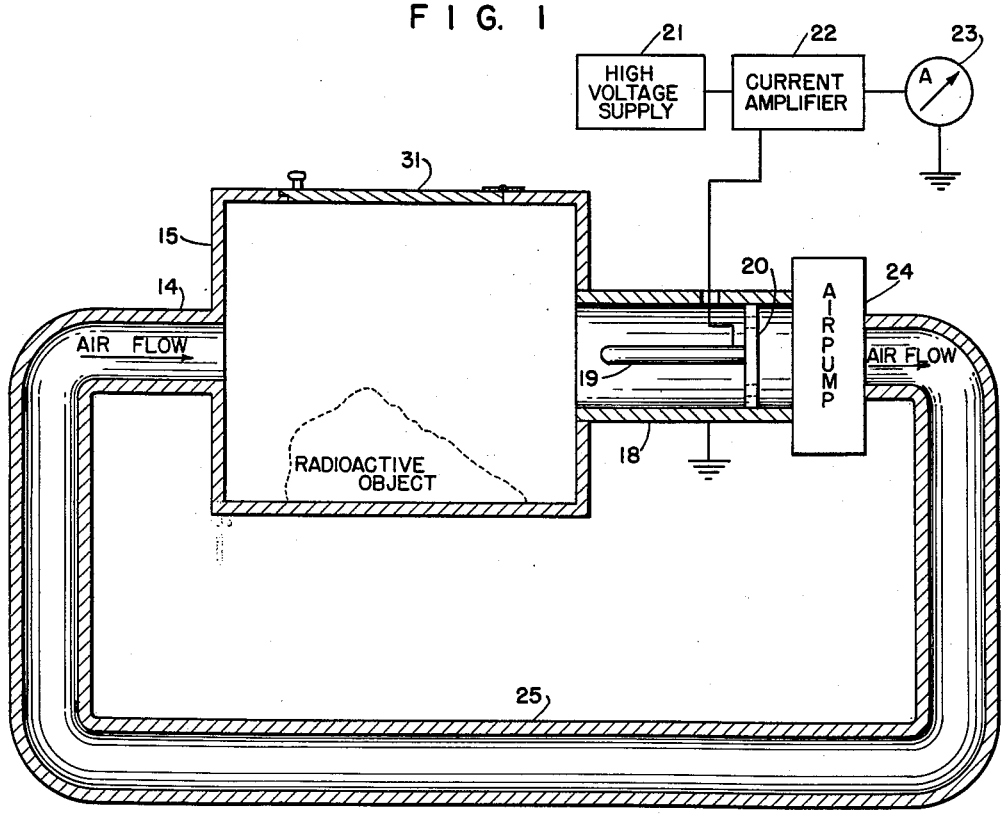

These and other objects will now become apparent from the following detailed description taken in conjunction with the accompanying drawings in which:

FIG. 1 is an illustration, partly in schematic form, of a preferred embodiment of this invention; and FIG. 2 illustrates an alternate mode of operation for measurement of solid samples.

In general the invention features three serially connected chambers, through which the gas to be monitored is passed by means of a pump, blower, or other suitable device. The input of the first chamber is equipped with a filter to remove all particulate matter. The function of the first chamber is to remove all pre-existing ions, thus rendering the device sensitive only to ions subsequently created within the monitor and impervious to externally existing ion sources. The function of the second chamber is to provide a reservoir for the accumulation of ions created within the monitor, while the third chamber collects these ions, yielding a current indicative of the radiation level present in the input stream.

More specifically, with reference to FIG. 1, the monitoring apparatus is seen to comprise three chambers 11, 15, and 18 serially connected between an inlet opening 13 and a suction pump 24. Chamber 11 may be generally rectangular in form and is constructed of a gas tight material such as metal or plastic. Inlet opening 13 is covered with a gas porous filter 12. Chambers 11 and 15 are joined by coupling 14, and, as illustrated, and for reasons to be described below, chamber 15 is of relatively large volume in comparison with chamber 18.

A pair of spaced parallel plate electrodes 16 are disposed in chamber 11 and are energized from a high voltage source 17, the high voltage being applied through suitable insulating bushings 10. Plates 16 are thus capable of collecting substantially all of the ions in the gas inlet stream.

Cylindrical chamber 18 is constructed of electrically conducting material, and is grounded as shown. A cylindrical electrode 19 is concentrically supported within chamber 18 by insulating struts 20 and electrically connected to high voltage source 21 and current amplifier 22, the output of the latter being indicated on ammeter 23. The outlet of chamber 18 terminates in gas pump 24 which draws gas through chambers 11, 15, and 18 and discharges it into the atmosphere.

Having described the nature and interconnection of the key elements of the invention, its operation will now be discussed.

Pump 24 provides a continuous flow of gas from the intake 13, through chambers 11, 15, and 18, and discharges the gas back into the atmosphere. Filter 12 removes particulate matter, while allowing gas to pass through. Sufficient potential is applied across electrodes 16, to collect all ions which may be present at this point, thus eliminating any effect from ions created by external sources. Chamber 15 serves as a "hold" volume, that is a reservoir for the accumulation of ion density created by radioactive emanations within the gas resulting from the presence of any radioactive gas in the stream through the serial chambers. But the flow rate as determined by pump 24 is sufficiently fast so that any such ions are carried out of chamber 15 before they can recombine. Inner electrode 19 is operated at a potential sufficiently high to collect substantially all the ions which enter chamber 18 from "hold" volume 15. The current created by the collection of these ions is amplified in amplifier 22 and indicated on ammeter 23. This current will be directly proportional to the concentration of radioactive gas in the inlet stream since "hold" volume 15, as previously described, is large by comparison to the volume of chamber 18, and when the volumetric flow rate is faster than a minimum determined by these volumes as well as the recombination coefficient of the gas. To demonstrate this effect, the expression for the current obtained in the ion chamber is $$I = nF$$

where $n$ = ion density in the hold chamber
$F$ = volumetric flow rate of gas through the system.

This equation holds only if the contribution to I from ions created in the ion chamber 18 is negligible. This condition is achieved by making the volume of chamber 18 much smaller than that of chamber 15.

Since it can be shown that $$n = \sqrt{\frac{n_o}{B}} \tanh\left(\sqrt{n_o B}\frac{V}{F}\right)$$

where $n_o$ = number of ion pairs formed per unit volume per second
$B$ = recombination constant
$V$ = volume of the "hold" chamber 15 then $$I = F\sqrt{\frac{n_o}{B}} \tanh\left(\sqrt{n_o B}\frac{V}{F}\right)$$

Then if we consider the value of I as F approaches infinity we find that I reaches a limit which is $$I_m = n_o V$$

From the above expressions it can be seen that the instrument is substantially independent of flow rate, provided this is made high enough. Also, system sensitivity is directly proportional to the volume of hold chamber 18, and to the concentration, C, of radioactive elements in the stream, since $n_o$ is given by $$n_o = C\bar{E}\frac{3.7 \times 10^4}{33}$$

where $C$ = concentration of radioactive gas in air in microcuries/ml.
$\bar{E}$ = average energy of the beta particle in electron volts.

Turning now to the flow rate required to achieve substantial independence of current response from flow rate, $$\frac{I}{I_m}$$

represents the fraction of maximum current obtained. From the above equations it can be shown that $$\frac{I}{I_m} = \frac{F}{V\sqrt{n_o B}} \tanh \frac{V\sqrt{n_o B}}{F}$$

Thus, if substantial independence is considered to occur when $$\frac{I}{I_m}$$

is close to unity; for example, if a 2 percent variation over the range of flow rate from the minimum allowed to an infinite rate is acceptable, this minimum flow can be determined by setting $$\frac{I}{I_m} = .98, \text{ from which, solving for F,}$$

$$F \approx 4V\sqrt{n_o B}$$

Assume a volume V of 46 liters, a concentration for tritium of 100×tolerance, which is $2 \times 10^{-3}\mu$ curies/cubic meter, and a recombination coefficient of $1.6 \times 10^6$ sec.$^{-1}$/ion pairs/cc.

then $n_o \cong 1350$
and $F = 27$ liters/second, that is the minimum required flow rate of pump 24.

Note that the device is also independent of the recombination coefficient and gives an instantaneous quantitative indication of the radioactive gas concentration.

While the foregoing description of the system disclosed in FIG. 1 has referred generally to an input gas stream possibly contaminated by radioactive gas, the apparatus is of special utility in the detection of tritium in air. As discussed earlier, tritium presents unusual detection problems due to the relatively low energy of emitted particles. It should be observed that the present system does not require that these emissions penetrate any absorbing medium, such as the windows found on customary particle detectors.

Apparatus was built according to the principles of this invention in which the volume of chamber 18 was 2.5 liters, the volume of chamber 15 was 46 liters, the voltage applied at electrode 19 was 200 volts and that at electrodes 16 was 600 volts. This apparatus operated at a flow rate of 27 liters/sec. and was capable of detecting tritium at a concentration one tenth the maximum permissible concentration of $2 \times 10^{-3}\mu$ curies per cubic meter.

In FIGURE 1 the concept of this invention was illustrated as a monitor for radioactive gases in an external atmosphere. Essentially the same techniques are applicable to monitoring the radioactivity content of solids samples, such as clothing, ore specimens and the like.

Referring to FIG. 2, it is seen that for this purpose there is no physically separate sweep chamber, and that first inlet 13 has been connected by housing 25 to the outlet side of air pump 24, forming a closed loop.

In this mode of operation the sample to be measured is first introduced into the "hold" chamber 15, through an air tight trap door (not shown). By operating the apparatus for a short period before attaching significance to the meter values of current, the ions collection chamber serves as a "sweep" unit. Thus, all the ions from extraneous sources are swept out and only those caused by radioactive concentrations in the sample contribute after this initial period. The operation then follows identically with operation in the first mode.

In view of the fact that numerous departures and modifications may now be made by those skilled in the art, the invention described herein is to be construed as limited only by the spirit and scope of the appended claims.

What is claimed is:

1. Radiation monitoring apparatus comprising, first means for removing ions from a gas, second substantially field-free means for accumulating ions resulting from radioactive emanations within a gas, third means for collecting ions, and means for drawing a gas serially through said first, second, and third means, in said order.

2. Apparatus for detection of radioactive gas in a gaseous medium comprising, first, second, and third serially connected chambers, said first chamber being formed as a sweep chamber for the removal of ions from gas flowing therethrough, said second chamber being substantially field-free and having a large volume compared to said third chamber, means within said third chamber for collecting ions, means for measuring current produced in said third chamber by ion-collection, means for providing a continuous flow of said gaseous medium through said first, second, and third chambers.

3. Apparatus for detection of radioactive gas in the atmosphere comprising first, second, and third chambers, said chambers being connected in series, said first chamber being formed with a pair of parallel plate electrodes, means for applying voltage to said electrodes sufficient to collect substantially all ions present in the air volume flowing therethrough, said second chamber being substantially field-free and of large volume as compared to said third chamber, said third chamber being formed as an ion collection chamber capable of collecting ions, means for measuring ion current in said third chamber, means for providing air flow through said first, second, and third chambers.

4. Apparatus for detection of radioactive gas in the atmosphere comprising first, second, and third serially connected chambers, said first chamber being formed as a sweep chamber capable of removing substantially all ions from the atmosphere flowing therethrough, said second chamber being substantially field-free and having a volume much larger than said third chamber, said third chamber being formed with two concentric electrodes, means for applying high voltage between said electrodes, means for measuring current between said electrodes, and means for providing continuous atmospheric flow through said chambers connected to the outlet of said third chamber.

5. Apparatus for the detection of radioactive gas in accordance with claim 4 wherein said atmosphere flow rate is above a predetermined value so as to render said current substantially independent of said flow rate.

6. Apparatus for the detection of radioactive gas in accordance with claim 4 wherein the atmospheric flow rate F through said serially connected chambers is given by the expression $$\frac{I}{I_m} = \frac{F}{V\sqrt{n_oB}} \tanh \frac{V\sqrt{n_oB}}{F}$$

where:

$\frac{I}{I_m}$ = the ratio of current measured at flow rate F to that current which would be measured at a substantially infinite flow rate, $V$ = the volume of said second chamber,
$B$ = the recombination constant of ions in said atmospheric flow,
$n_o$ = the number of ion pairs formed per unit volume per second, wherein $\frac{I}{I_m}$ is a fraction close to unity 7. Apparatus for the detection of radioactive gas in the atmosphere comprising a first chamber having a gas inlet open to the atmosphere, a pair of electrodes placed within said chamber, means for providing high voltage across said electrodes sufficient to collect all gaseous ions present in said first chamber, a second chamber being arranged to be substantially field-free and having an inlet connected to the outlet of said first chamber, a third chamber having an inlet connected to the outlet of said second chamber, said third chamber being formed as an ionization chamber having a volume much smaller than the volume of said second chamber, means for measuring the current output from said third chamber, means for producing a flow of gas from the inlet of said first chamber through said second and third chambers, means for removing particulate matter from said gas flow at the inlet of said first chamber.

8. Apparatus for measurement of radioactive contamination of objects comprising first and second chambers each having separate gas intakes and outlets, the outlet of said first chamber being connected to inlet of said second chamber, the outlet of said second chamber being connected to the inlet of said first chamber, said first and second chambers and said inlets and outlets thereby forming a closed loop, means for continuously circulating the gas around said closed loop, said first chamber being arranged to be substantially field-free and adapted to receive physical objects therein, said second chamber being formed with a pair of electrodes capable of collecting ions, means for applying high voltage to said electrodes, means for measuring the current resulting from collection of ions on said electrodes.

9. Apparatus for the detection of radioactive contamination objects in accordance with claim 8 wherein the volume of said second chamber is much smaller than that of said first chamber.

10. Apparatus for the detection of radioactivity in a gaseous medium comprising, a sweep chamber for removal of ions of gas flowing therethrough, a field-free chamber, means for collecting and detecting ions, and means for providing a continuous flow of said gaseous medium through said sweep chamber, said field-free chamber and said ion collecting and detecting means, in said order.

References Cited in the file of this patent

UNITED STATES PATENTS

| | | |
|---|---|---|
| 2,531,144 | Manley | Nov. 21, 1950 |
| 2,576,616 | Livingston et al. | Nov. 17, 1951 |
| 2,599,922 | Kanne | June 10, 1952 |
| 2,622,208 | Bernstein et al. | Dec. 16 1952 |
| 2,625,657 | Kanne | June 13, 1953 |
| 2,736,812 | Weinstein et al. | Feb. 28 1956 |
| 2,755,391 | Keyes | July 17, 1956 |
| 2,917,648 | Davidon | Dec. 15, 1959 |
| 2,924,715 | Hendee et al. | Feb. 9, 1960 |